(12) United States Patent
Hattori

(10) Patent No.: US 8,330,035 B2
(45) Date of Patent: Dec. 11, 2012

(54) TERMINAL BOX FOR SOLAR CELL MODULES

(75) Inventor: Yutaka Hattori, Hirakata (JP)

(73) Assignee: Kitani Electric Co., Ltd., Osaka (JP)

( * ) Notice: Subject to any disclaimer, the term of this patent is extended or adjusted under 35 U.S.C. 154(b) by 848 days.

(21) Appl. No.: 11/597,421

(22) PCT Filed: May 19, 2005

(86) PCT No.: PCT/JP2005/009137
§ 371 (c)(1),
(2), (4) Date: Jan. 24, 2007

(87) PCT Pub. No.: WO2005/117141
PCT Pub. Date: Dec. 8, 2005

(65) Prior Publication Data
US 2008/0190477 A1    Aug. 14, 2008

(30) Foreign Application Priority Data

May 25, 2004 (JP) ................................. 2004-155105
Dec. 24, 2004 (JP) ................................. 2004-374266

(51) Int. Cl.
*H01L 31/052* (2006.01)
*H01L 31/042* (2006.01)
*H01R 9/28* (2006.01)
*H05K 7/20* (2006.01)

(52) U.S. Cl. ......... 136/244; 174/547; 136/246; 439/709

(58) Field of Classification Search .................. 136/244; 174/547
See application file for complete search history.

(56) References Cited

U.S. PATENT DOCUMENTS 6,225,793 B1 * 5/2001 Dickmann ..................... 323/230
2003/0062078 A1 * 4/2003 Mimura ........................ 136/244
(Continued)

FOREIGN PATENT DOCUMENTS

JP            58-53164        4/1983
(Continued)

OTHER PUBLICATIONS

Japanese Office Action—Notice of Grounds for Rejection issued on Jan. 18, 2008 for counterpart Japanese Application No. 2007-096330 (with English translation).

(Continued)

*Primary Examiner* — Jennifer Michener
*Assistant Examiner* — Matthew Martin
(74) *Attorney, Agent, or Firm* — Wenderoth, Lind & Ponack, L.L.P.

(57) ABSTRACT

A condition of not permitting an increased temperature value of a diode to exceed the junction temperature is satisfied by a simple structure at a low cost. A plurality of countercurrent prevention diodes between terminal boards to which electrodes of solar cell modules are connected are connected in parallel. When an output current from the solar cell module flows in a circuit of the plurality of diodes connected in parallel, a current flowing in each diode is reduced by a factor of the number of diodes connected in parallel, for instance, when the three diodes are connected in parallel, the current becomes one third. When the value of the flowing current is reduced, a heating value is also reduced. A heat radiating piece is provided on the terminal board.

7 Claims, 19 Drawing Sheets

U.S. PATENT DOCUMENTS

| | | | |
|---|---|---|---|
| 2003/0193322 A1* | 10/2003 | Higashikozono et al. | .... 323/299 |
| 2004/0047118 A1 | 3/2004 | Bergmann et al. | |

FOREIGN PATENT DOCUMENTS

| | | |
|---|---|---|
| JP | 1-127391 | 8/1989 |
| JP | 5-1253 | 1/1993 |
| JP | 6-314760 | 11/1994 |
| JP | 7-29749 | 6/1995 |
| JP | 7-32994 | 6/1995 |
| JP | 9-128070 | 5/1997 |
| JP | 11-026035 | 1/1999 |
| JP | 11-195889 | 7/1999 |
| JP | 11-251614 | 9/1999 |
| JP | 11-298022 | 10/1999 |
| JP | 3069523 | 6/2000 |
| JP | 2000-261177 | 9/2000 |
| JP | 2001-024371 | 1/2001 |
| JP | 2001-135847 | 5/2001 |
| JP | 2001-168363 | 6/2001 |
| JP | 2001-168368 | 6/2001 |
| JP | 2001-250965 | 9/2001 |
| JP | 2002-359389 | 12/2002 |
| JP | 2003-347490 | 12/2003 |
| JP | 2004-221210 | 8/2004 |
| WO | 00/30216 | 5/2000 |

OTHER PUBLICATIONS

Notice of Grounds for Rejection issued Aug. 7, 2007 in Japanese application 2007-096354, which is a foreign counterpart to the present U.S. application.

Notice of Reasons for Rejection issued Aug. 23, 2011 for corresponding Japanese Application No. 2007-260815 (with partial English translation).

* cited by examiner

TERMINAL BOX FOR SOLAR CELL MODULES

TECHNICAL FIELD

This invention relates to a terminal box used to connect solar cell modules forming a solar power generation system for converting solar energy directly into electric energy.

BACKGROUND ART

As shown in FIG. 14, a solar power generation system has solar cell panels (solar cell modules M) installed on a house roof to supply electric power from the modules M through a connection box Q, an inverter R and a distribution board S to electrical apparatuses E. The solar cell modules are arranged so as to be flush with one another and are connected in series or parallel through terminal boxes B. Each terminal box B is fixed by adhesion to the back of the module M with watertightness kept using seal material.

As shown in FIG. 15, a conventional terminal box B has a pair of terminal boards 2 arranged side by side in a top-open box body 1. Positive and negative electrodes a of a solar cell module M are connected to the respective terminal boards 2. A diode 3 for preventing countercurrent is mounted between the terminal boards 2 and cables P for outside connection are connected to the terminal boards 2 (see Patent publication 1). In FIG. 15, numeral 6 denotes a cover.
Patent publication 1: JP patent publication 11-26035A Another terminal box B is known which is provided with three or more terminal boards 2 to connect a plurality of solar cell modules M for improved performance of the solar cell modules and higher current collecting efficiency (see Patent publication 2). In this terminal box B, too, a diode 3 for preventing countercurrent is provided between each adjacent pair of the terminal boards 2.
Patent publication 2: JP patent publication 2002-359389A

DISCLOSURE OF INVENTION

Object of the Invention

With the spread of solar power generation systems, durability and reliability are required for such systems as well as their terminal boxes. In order to improve durability and reliability of a terminal box B, it is required that the temperature rise of the diode 3 should not exceed its junction temperature (guaranteed working temperature) even if a load equal to 1.25 times the output current is applied to the diode for one hour at an ambient temperature of 75° C.

One way to meet this requirement is to use a diode having high junction temperature. But such a diode is expensive.

An object of the present invention is to prevent the temperature of the diode 3 from exceeding its junction temperature, with a simple and inexpensive means.

Means to Achieve the Object

To achieve this object, according to the present invention, a plurality of diodes are provided between each adjacent pair of the terminal boards in parallel to each other. With this arrangement, since the load of the output current is borne by the plurality of diodes, it is possible to reduce the current value borne by each diode.

If the output current I of the solar cell modules M flows through a circuit including a plurality of diodes arranged in parallel to each other, the current i flowing through each diode is equal to the value I divided by the number of diodes disposed between each pair of the adjacent terminal boards. For example, if this number is 3, the current i will be one-third of the output current I (I=3i). The lower the current value, the smaller the amount of heat generated.

By arranging the diodes in parallel to each other, an equal current will flow through each diode if the resistivities of the diodes are the same. But it is very difficult and also expensive to manufacture diodes of the same standard so as to have a uniform resistivity.

On the other hand, generally, if diodes are arranged in parallel to each other, drift occurs, that is, the current drifts toward a diode having a lower resistivity.

If drift does not pose a problem, it is possible to arrange the diodes in parallel to each other, thereby reducing the cost of the terminal box for solar cell modules.

However, if it is desired to avoid drift, according to this invention, resistors are used to prevent drift.

Also, the heat generated differs with different resistivities of diodes. Difference in the temperature of the diodes increases the difference in the resistivity, so that drift will increase.

Therefore, the present invention aims to solve the problem by radiating heat of the diodes and making uniform the temperatures of the diodes arranged in parallel to each other.

Advantages of the Invention

According to the present invention, because a load of the output current is borne by a plurality of diodes, the reliability of diodes can be maintained without using expensive diodes having high heat resistance. The cost is reasonable and the construction is simple.

Also, drift can be prevented by providing drift prevention resistors, radiating heat from the diodes, or making uniform the temperatures of the diodes arranged in parallel to each other.

Figure 1A:
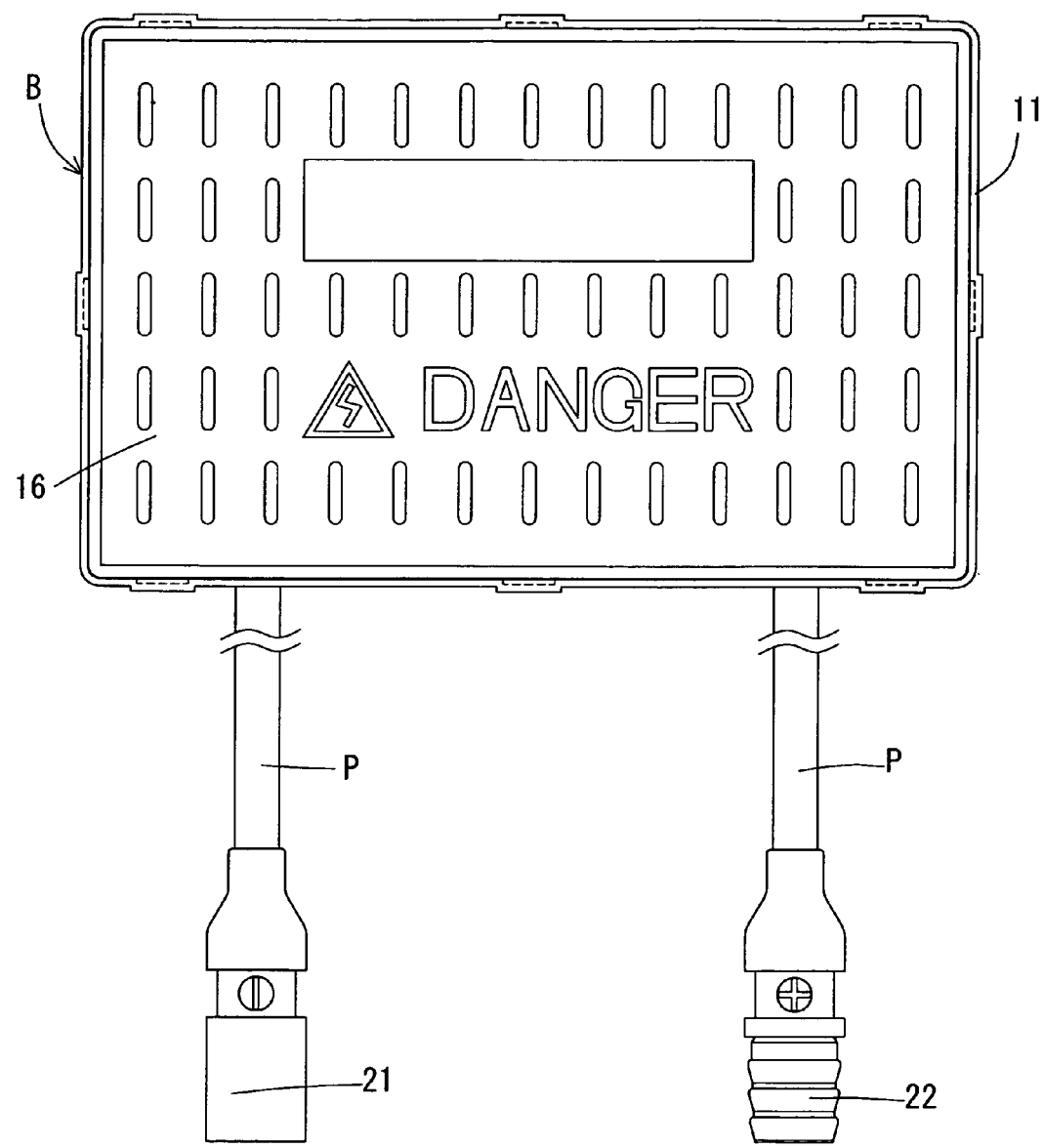
FIG. 1(*a*) Partially omitted front view of one embodiment
FIG. 1(*b*) Side view of the embodiment
FIG. 1(*c*) Partially omitted rear view of the embodiment
FIG. 1(*d*) Partially omitted front view of the embodiment with the cover removed
FIG. 1(*e*) Sectional view taken along line X-X of FIG. 1(*d*)
FIG. 1(*f*) Sectional view taken along line Y-Y of FIG. 1(*d*)
FIG. 2 Schematic front view of another embodiment
FIG. 3 Schematic front view of a further embodiment
FIG. 4(*a*) Partially omitted front view of another embodiment
FIG. 4(*b*) Rear view of the embodiment
FIG. 4(*c*) Plan view of the terminal board of the embodiment before assembly
FIG. 4(*d*) Perspective view of the terminal board of the embodiment
FIG. 4(*e*) Offset stopper for the cable lock of the embodiment
  (a) Plan view (b) Front view (c) Bottom view (d) Perspective view
FIG. 5 Partially omitted front view of another embodiment with the cover removed
FIG. 6(*a*) Partially omitted front view of another embodiment with the cover removed
FIG. 6(*b*) Sectional side view of the embodiment
FIG. 6(*c*) Partial perspective view of the terminal board of the embodiment FIG. 7 Terminal board of the embodiment
(a) Plan view (b) Side view (c) Sectional side view
(d) Sectional view taken along line X-X of (a)
(e) Sectional view taken along line Y-Y of (a)
FIG. 8 Electrical connection wiring diagram between the solar cell module and the terminal box
FIG. 9 Perspective views of embodiments of heat transfer plate
FIG. 10 Plan view of another embodiment of heat transfer plate
FIG. 11 Partially omitted front view of another embodiment with the cover removed
FIG. 12 Perspective view of another embodiment with the cover removed
FIG. 13 Perspective views of the parts of the embodiment
(a) Heat transfer plate (b) Heat radiating plate (c) Box body
FIG. 14 Schematic view of solar power generation system
FIG. 15 (a) Plan view of prior art (b) Vertical sectional view
Figure 1B:
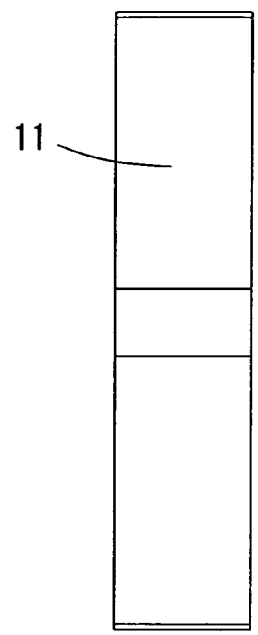
Figure 1C:
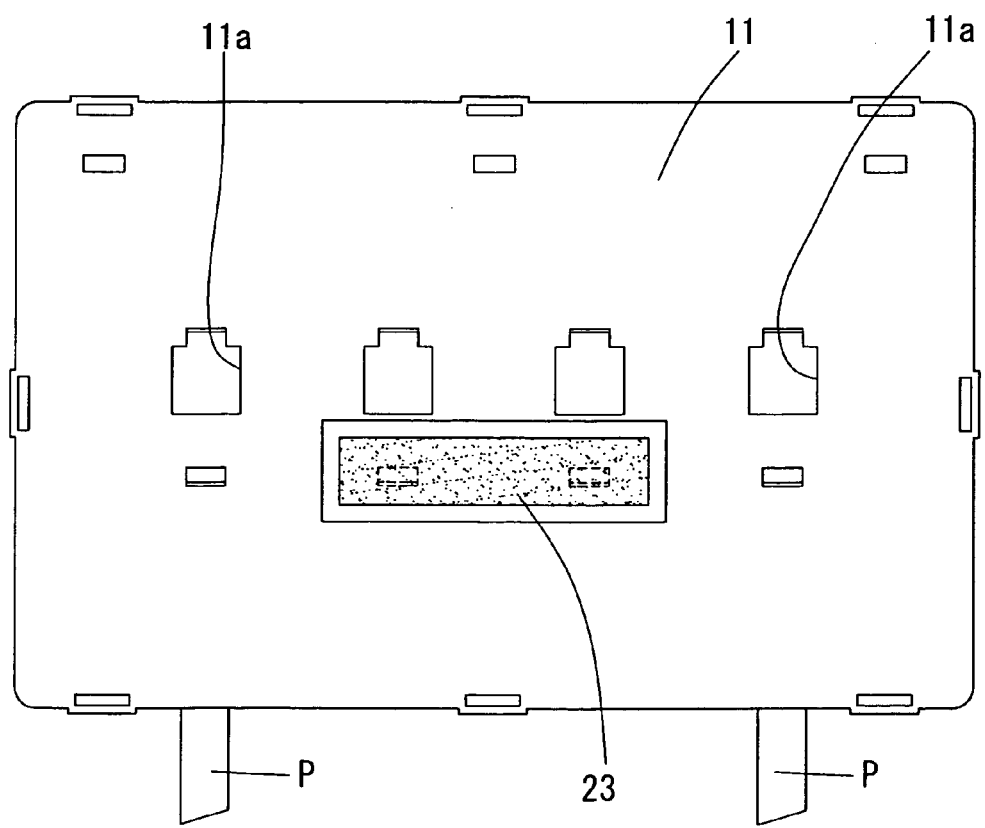

DESCRIPTION OF THE REFERENCE NUMBER 1, 11 Box body
2, 12 Terminal board
3, 13 Countercurrent prevention diode
13a lead of diode
15 Heat radiating sheet
18 Drift prevention resistor
19 Temperature switch
20 Heat radiating piece
30 Heat transfer plate
31 Notch for mounting countercurrent prevention diode
a Electrode of solar cell module
B Terminal box
M Solar cell module
P Cable for outside connection

BEST MODE FOR EMBODYING INVENTION

One embodiment of this invention is a terminal box for solar cell modules comprising a box body, a plurality of terminal boards received in the box body for connection of electrodes a of the solar cell modules, and countercurrent prevention diodes 13 provided between adjacent ones of the terminal boards, characterized in that a plurality of the diodes are provided between each adjacent pair of the terminal boards in parallel to each other.

Preferably, a drift prevention resistor is connected in series with each diode to make uniform the loads borne by the diodes. The resistivity of the resistors are set properly based on the temperature rise of the diodes obtained by experiments for different manner of mounting.

Also, a temperature switch is preferably connected in series with each diode so that the switch will turn off to cut the current before each diode reaches its junction temperature, and turn on to supply the current to the diode when the temperature of the diode decreases. This prevents excessive temperature rise of the diodes.

Further, heat transfer plates may be mounted in continuous contact with the respective diodes to radiate heat from the diodes, thereby making uniform the temperatures of the diodes. Drift can be prevented by radiating heat from the diodes and making uniform the temperatures of the diodes.

The heat transfer plates may be provided in any of the embodiments and may be provided integrally with the respective terminal boards.

Another embodiment of this invention is a terminal box for solar cell modules which comprises a box body, a plurality of terminal boards received in the box body for connection of electrodes of the solar cell modules, and countercurrent prevention diode provided between adjacent ones of the terminal boards, and each terminal board is provided with a heat radiating piece.

By heat radiation through the heat radiating pieces, drift can be prevented. The manner of mounting of the heat radiating pieces may be determined by doing experiments so that its effect will be sufficient. The heat radiating pieces, too, may be provided integrally with the terminal board.

In the arrangement in which the diodes are connected in parallel to each other, the heat transfer plates and the heat radiating pieces may be used. Part or whole of the heat radiating pieces (terminal boards) may serve as heat transfer plates. Both in such a combined embodiment and separate embodiments, the box body may be formed with heat radiating plates, heat radiating fins or heat radiating notches to restrict temperature rise of the diodes.

Further, in any of the embodiments, a plurality of the countercurrent prevention diodes may be arranged between each adjacent pair of the terminal boards in a staggered fashion in the direction in which the terminal boards are arranged in parallel to each other.

This arrangement further increases the heat radiating efficiency through the terminal boards and restricts the temperature rise of the diodes because pairs of the diodes as a heat source are staggered between the terminal boards, so that the heat sources are scattered.

Preferably, the diodes are located near the edges of the terminal boards to increase the degree of scattering.

In any of the embodiments, the countercurrent prevention diodes are preferably connected to the terminal boards by fitting leads of the diodes in notches of the terminal boards. If the diodes are fixed by soldering, they will suffer damage more or less and be liable to change in the resistivity. If they are fixed by fitting, soldering is not needed any more. So change in resistivity by soldering is avoided.

EMBODIMENTS

FIGS. 1(a) to 1(f) show one embodiment, which includes a rectangular box body 11 having an open top and made of polyphenylene oxide (PPO) resin or polyphenylene ether (PPE) resin and two pairs of terminal boards 12 (i.e. four terminal boards 12) arranged in parallel to each other. Positive and negative electrodes a of the solar cell modules M are connected to the respective terminal boards 12. Each of the electrodes a extends through a hole 11a and soldered to the center of one of the terminal boards 12. Spare solder 14 is provided at a point where each terminal board 12 is connected to the corresponding electrode a.

Between each adjacent pair of the terminal boards 12, two (bypass) countercurrent prevention diodes 13 are provided one above the other. The front sides of the entire terminal boards 12 are covered by a heat radiating sheet 15 made of a resin having high heat conductivity. The sheet 15 is formed with holes 15a through which the electrodes a are inserted for connection with the respective terminal boards.

Two cables P for outside connection are connected to the bottom (in FIG. 1a) of the box body 11 at both ends thereof. At one end thereof, each cable P has its conductor connected to one of the terminal boards 12 at both ends by pressing or welding, and is also fixed to the box body 11 by means of a cable lock 17 having a stopper ring 17a. At the other end of each cable P, there is provided a male connector 22 or female connector 21, which is connected to the female or male connector 21 or 22 of a cable P of the adjacent terminal box B.

The front opening of the box body 11 is covered by a cover 16 of PPO or PPE resin, which is fitted through a waterproof ring (not shown) for watertightness. The box body 11 is filled with e.g. silicon resin, if necessary. The back of the box body 11 is subjected to creping and the terminal box B is fixed to the backs of the solar cell modules M through an adhesive tape 23 provided at its back.

The terminal box B of this embodiment is bonded to the backs of the modules M keeping watertightness by use of seal material. Each cable P of the terminal box B are connected to female or male connector 21, 22 of a cable of the adjacent terminal box B. The terminal boxes B are thus connected in series or parallel by selecting the manner of connection.

In this embodiment, since a pair of diodes are provided in parallel to each other between any adjacent terminal boards 12, the current i that flows through each diode 13 is half the output current I of the solar cell modules M (I=2i). Thus, as the diodes 13, it is possible to use ones having a junction temperature that is barely higher than the temperature determined by the amount of heat generated by each diode when a current i passes therethrough.

Figure 2:
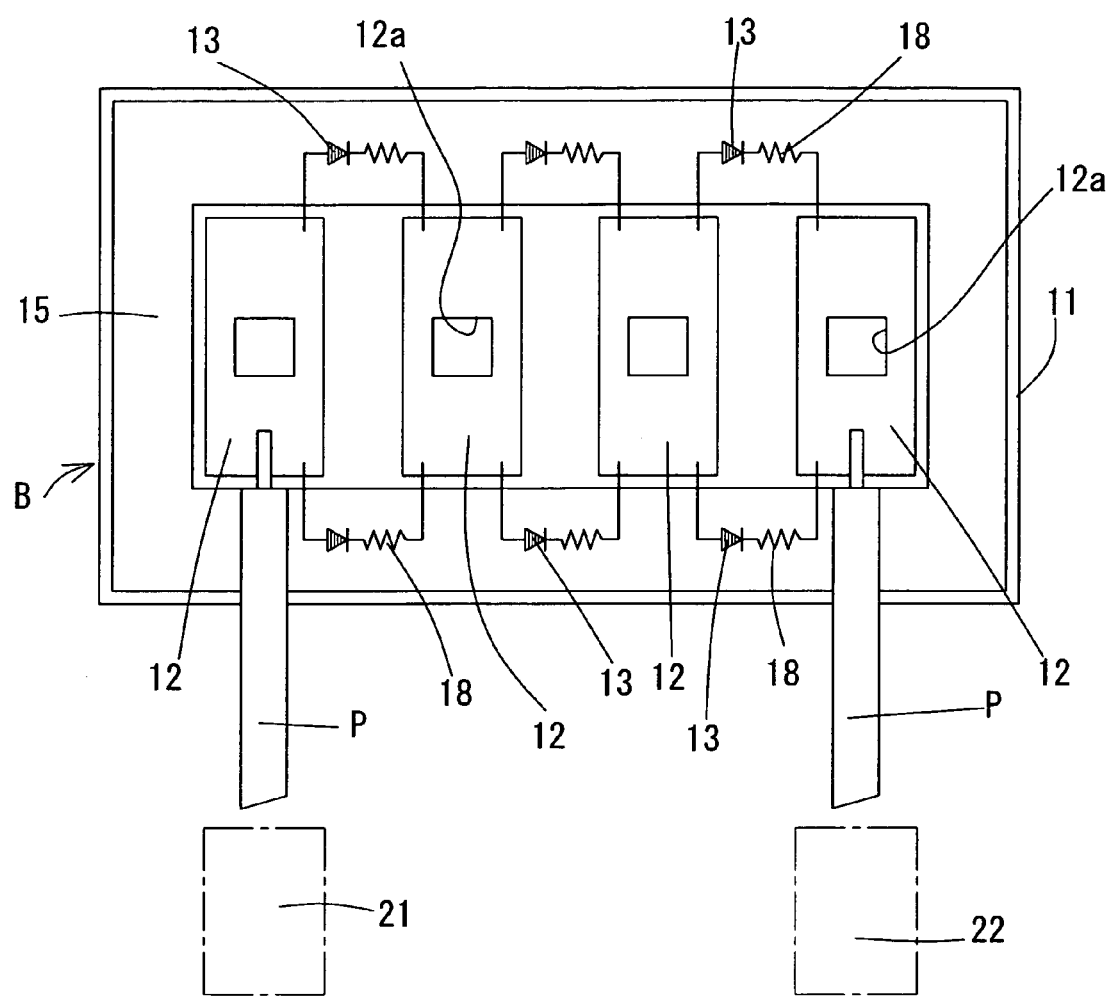
Figure 3:
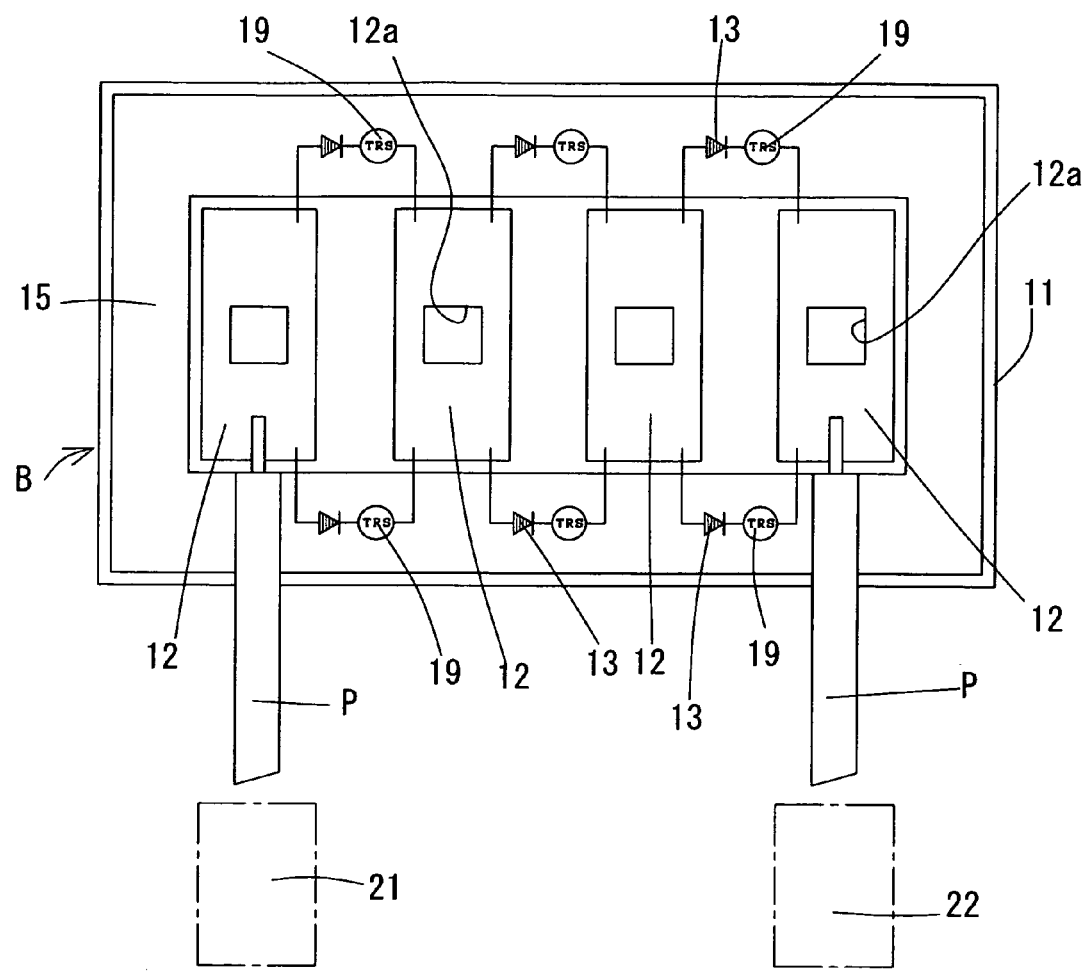

FIGS. 2 and 3 show other embodiments. In the embodiment of FIG. 2, a countercurrent prevention resistor 18 is connected in series with each diode 13 to make uniform the loads on the diodes 13. For this purpose, with the current passed thorough the diodes 13 and the resistors 18, the resistivity of each resistor 18 is adjusted such that the current that flows through each diode 13 is substantially equal to the current that flows through any other diode (that is, the resistivity of each series circuit comprising one of the diodes 13 and one of the resistors 18 is substantially equal to the resistivity of any other series circuit).

In the embodiment of FIG. 3, a temperature switch 19 such as a thermostat switch is connected in series with each diode 13 so that the switch 19 will turn off to cut the current before each diode 13 reaches its junction temperature, and turn on to supply the current to the diode when the temperature of the diode 13 decreases. This prevents excessive temperature rise of the diodes.

Figure 4A:
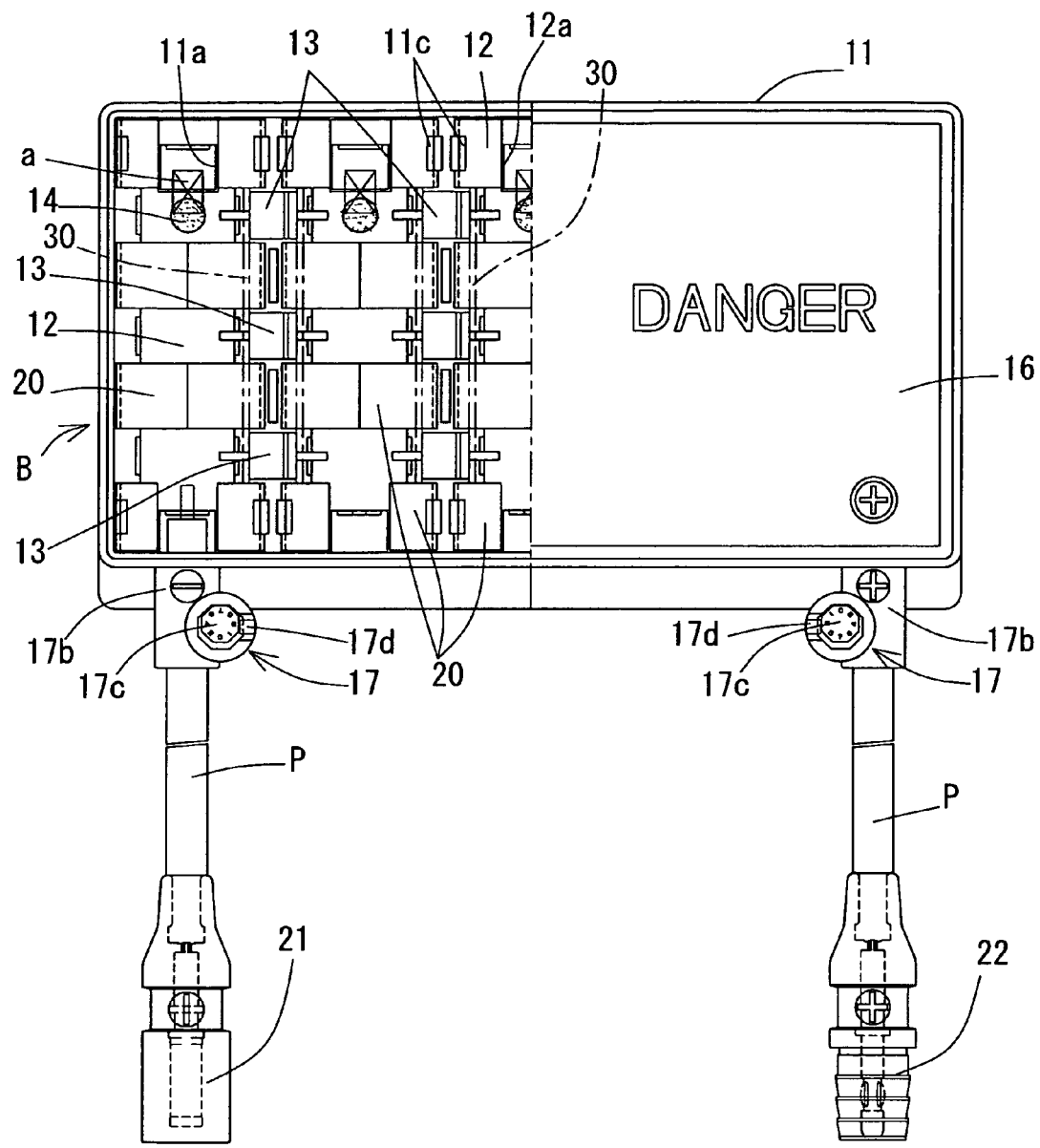
Figure 4B:
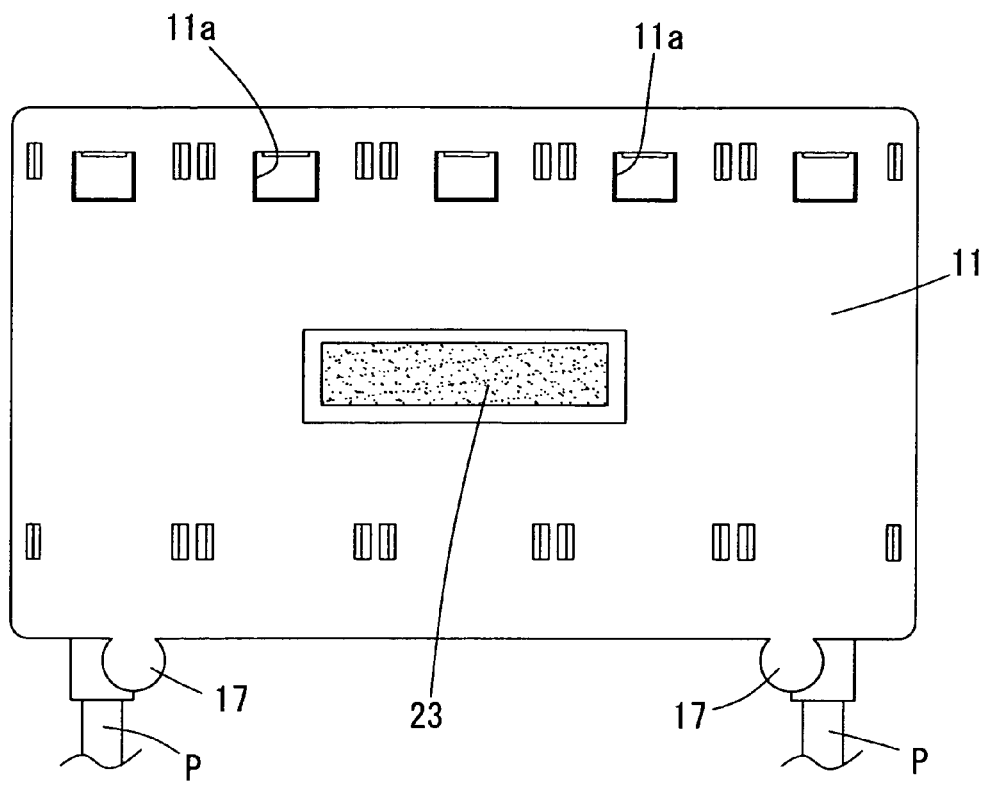
Figure 4C:
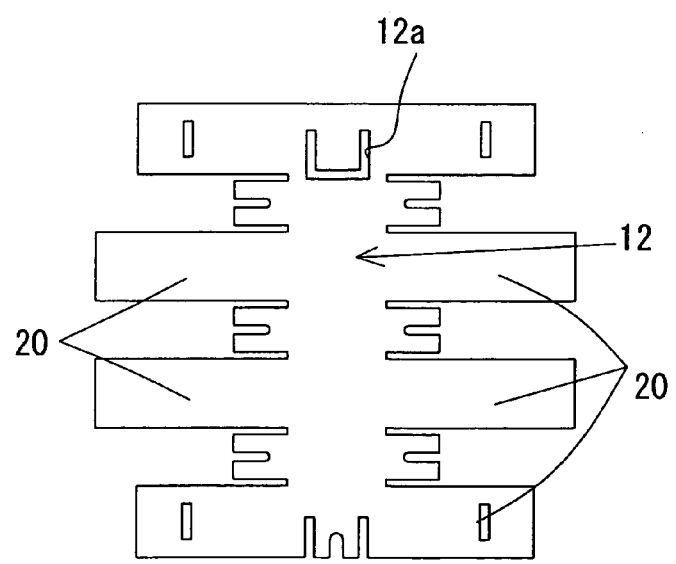
Figure 4D:
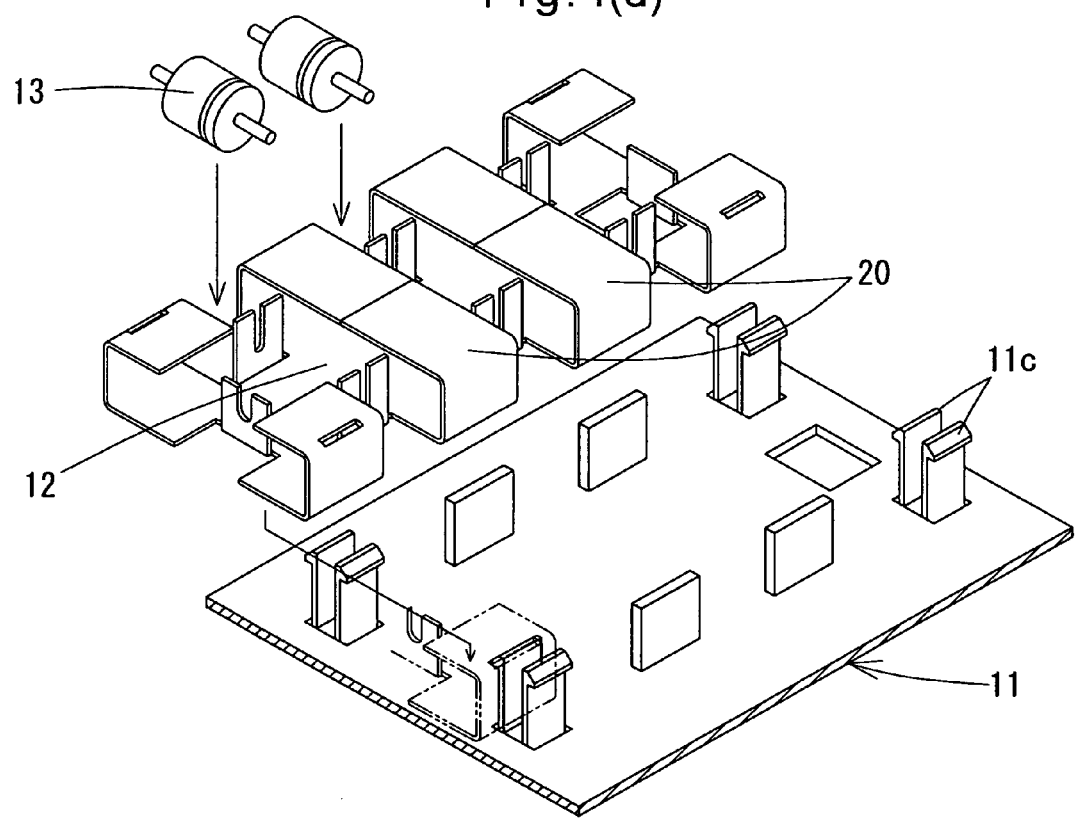

In the embodiment of FIG. 4, each terminal board 12 is formed integrally with heat radiating pieces 20 protruding, as shown in FIG. 4(c), protruding from both side edges of the terminal board 12, which is in itself of a conventional structure. As shown in FIG. 4(d), the terminal board 12 is fitted on the box body 11 with its heat radiating pieces 20 bent upward to increase its surface area and thus the heat radiating effect.

Figure 4E:
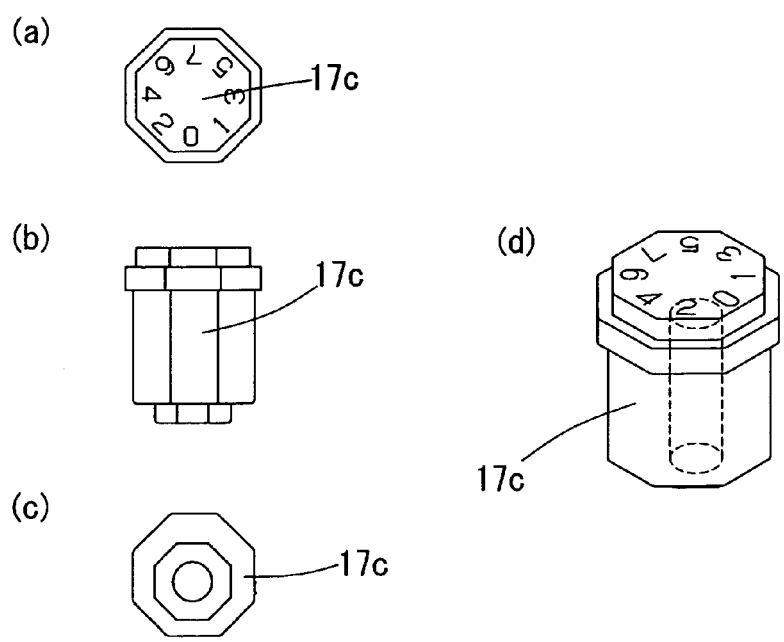

In this embodiment, the cable locks 17 each have an offset stopper 17c (shown in FIG. 4(e)) mounted on a tube 17b formed integrally with the box body 11 with its side surface abutting the cable P to clamp the cable with a degree of contact pressure determined by the rotation angle of the offset stopper 17c, which is indicated by the numbers on the surface of the offset stopper 17c. In this state, the cable lock 17 is fixed by a screw 17d.

Figure 5:
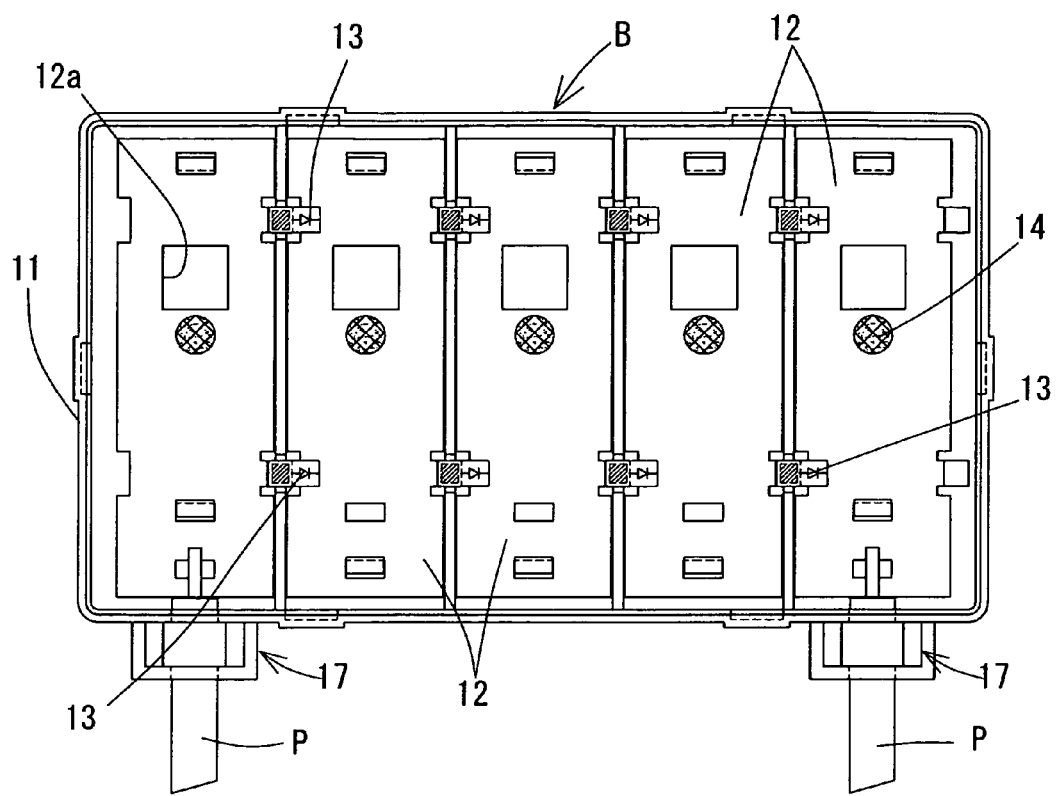

In these embodiments, the number of terminal boards 12 arranged in parallel to each other in each terminal box B is determined according to the number of solar cell modules M connected to the terminal box B. For example, three pairs of (i.e. six) terminal boards are arranged in each terminal box B if three modules M are connected to the terminal box B. But the number of terminal boards may be two, three, five (as shown in FIG. 5), or may be larger than six. The number of diodes 13 arranged in parallel to each other is also not limited to two, but may be three as shown in FIG. 4, four, five, or more.

Figure 8:
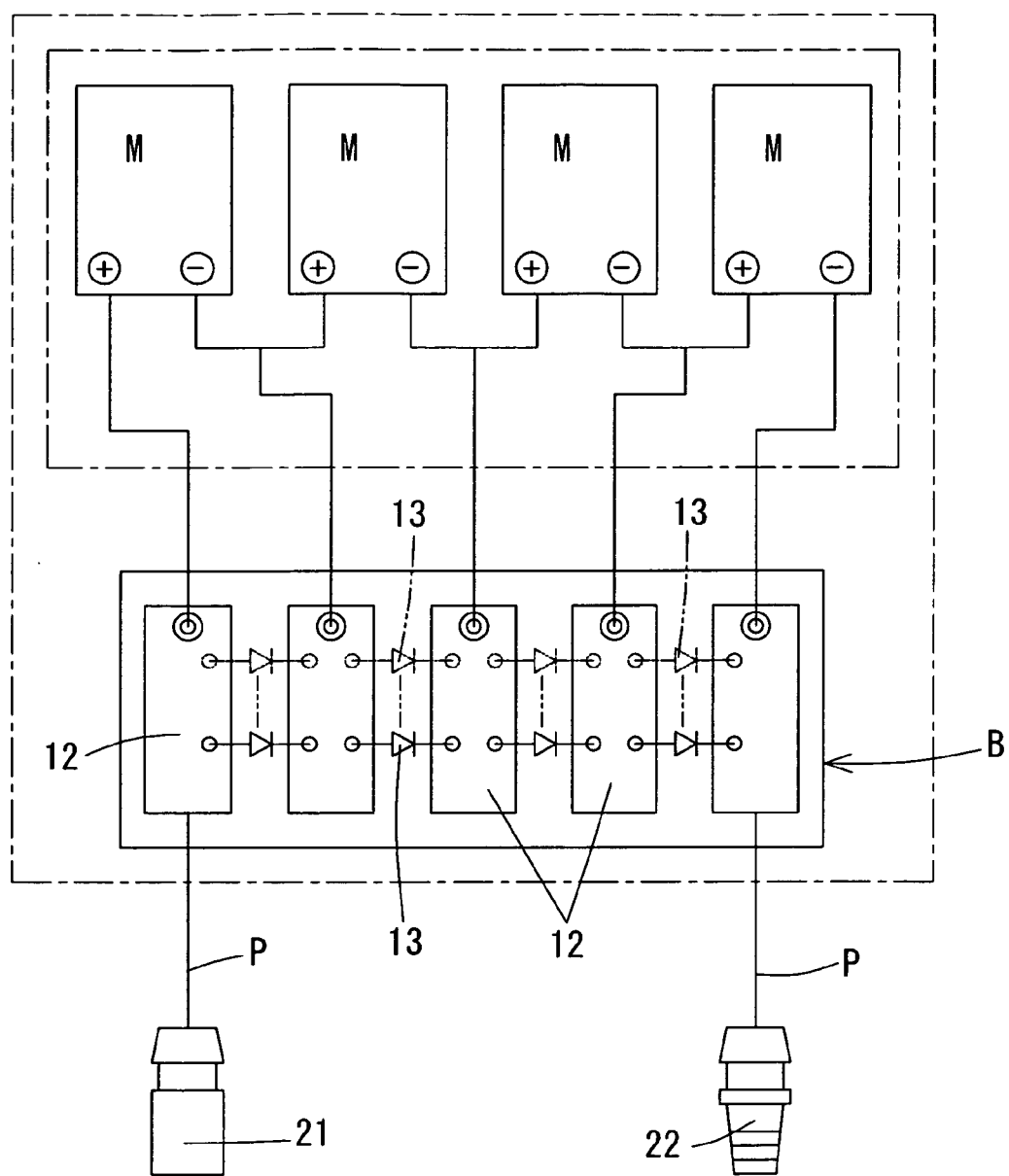

If an even number of terminal boards 12 are received in each terminal box, a pair of terminal boards 12 are provided for each module M. If an odd number of terminal boards 12 are received in each terminal box, the terminal boards 12 are connected to the modules M e.g. as shown in FIG. 8.

In an arrangement in which the terminal boards 12 each include the heat radiating pieces 20, its shape is not particularly limited provided a sufficient heat radiating effect is achieved. For example, as shown in FIGS. 6(a) to 6(c) and FIG. 7, heat radiating pieces 20 bent in a wavy fashion may be used. In this arrangement, the terminal boards 12 take an upright position, so that the heat radiating effect increases. That is, the terminal boards 12 themselves serve as heat radiating pieces 20.

Further, heat transfer plate 30 may be provided each in contact with a plurality of diodes 13 to radiate heat from the diode 13. This makes uniform the temperatures of the diodes 13, thereby preventing drift.

Figure 1D:
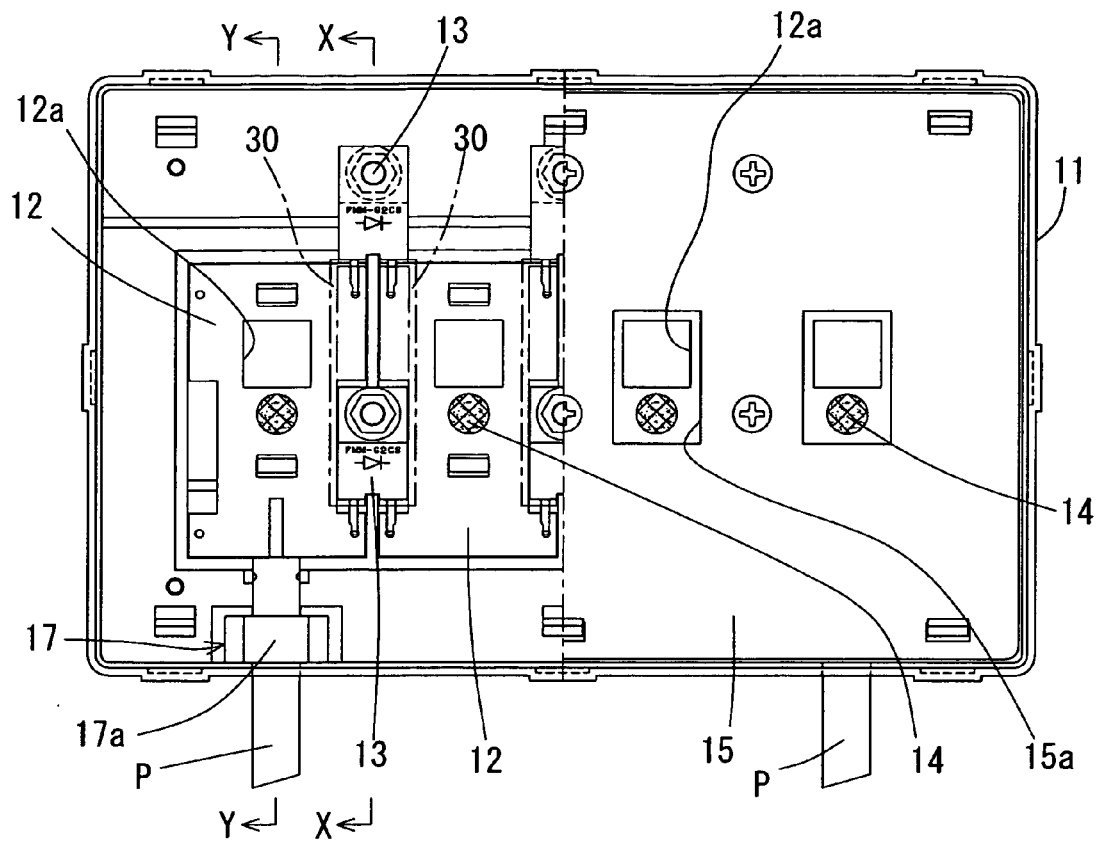
Figure 1E:
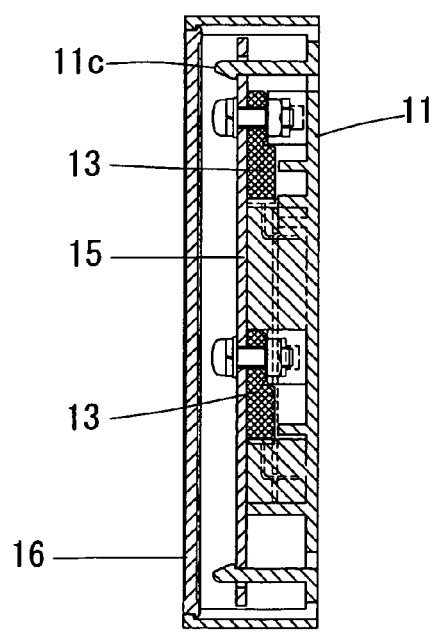
Figure 1F:
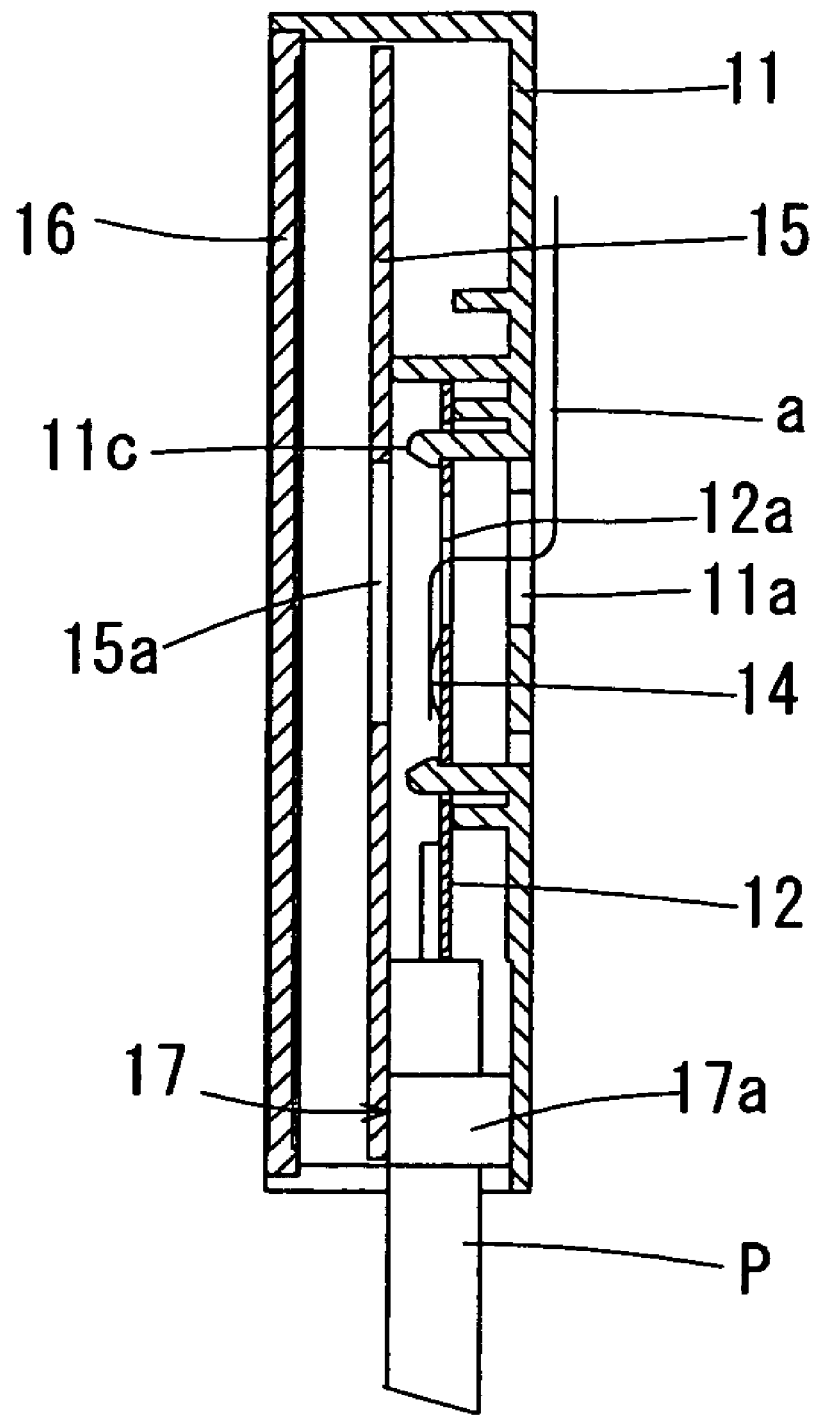
Figure 6A:
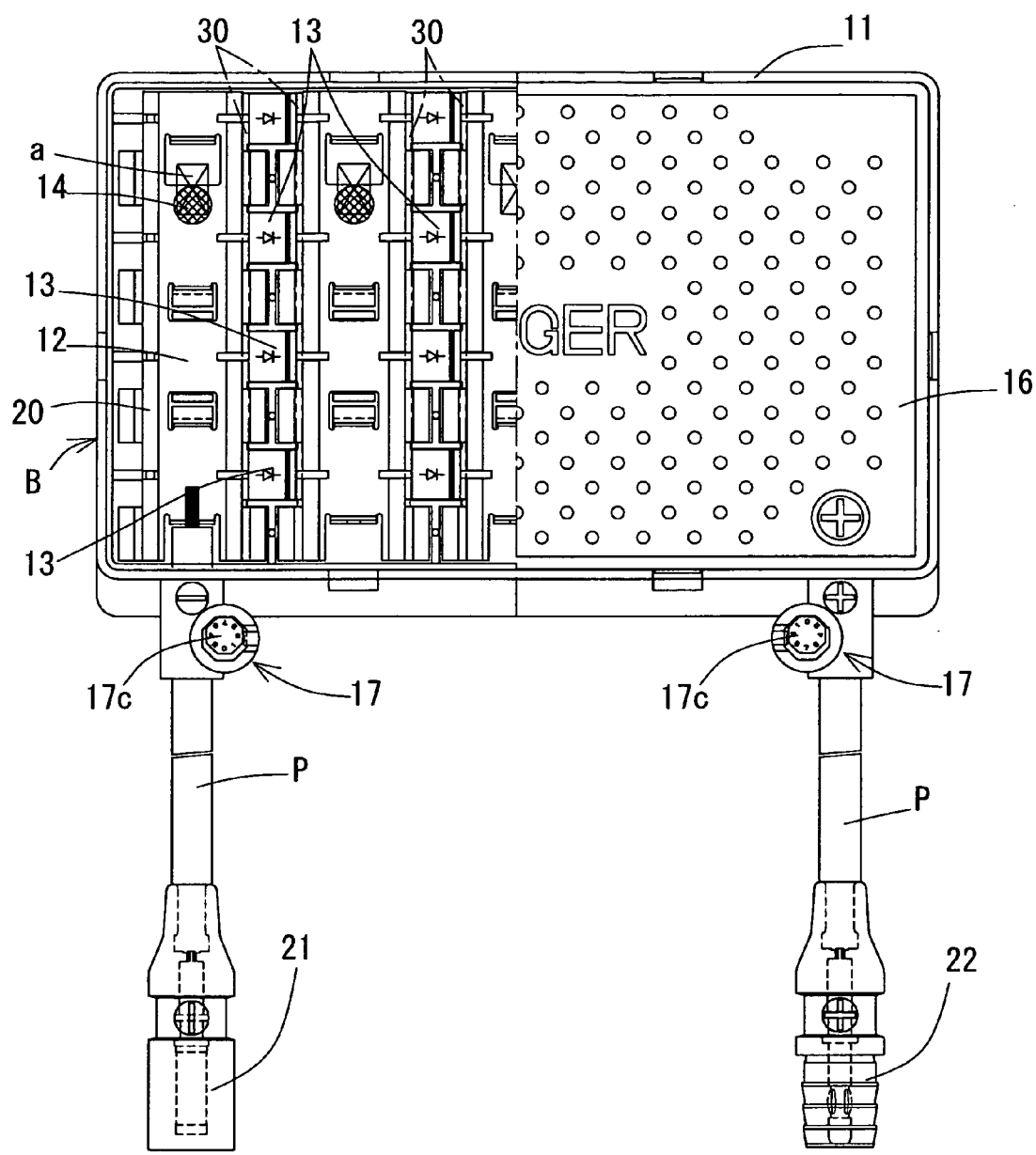
Figure 6B:
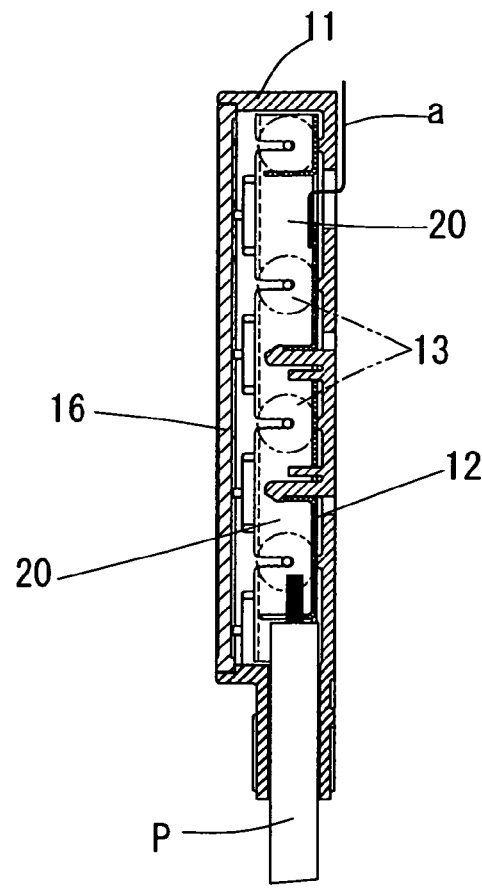
Figure 6C:
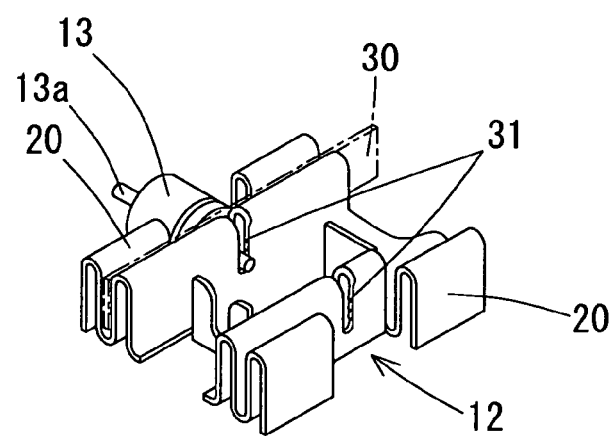
Figure 7:
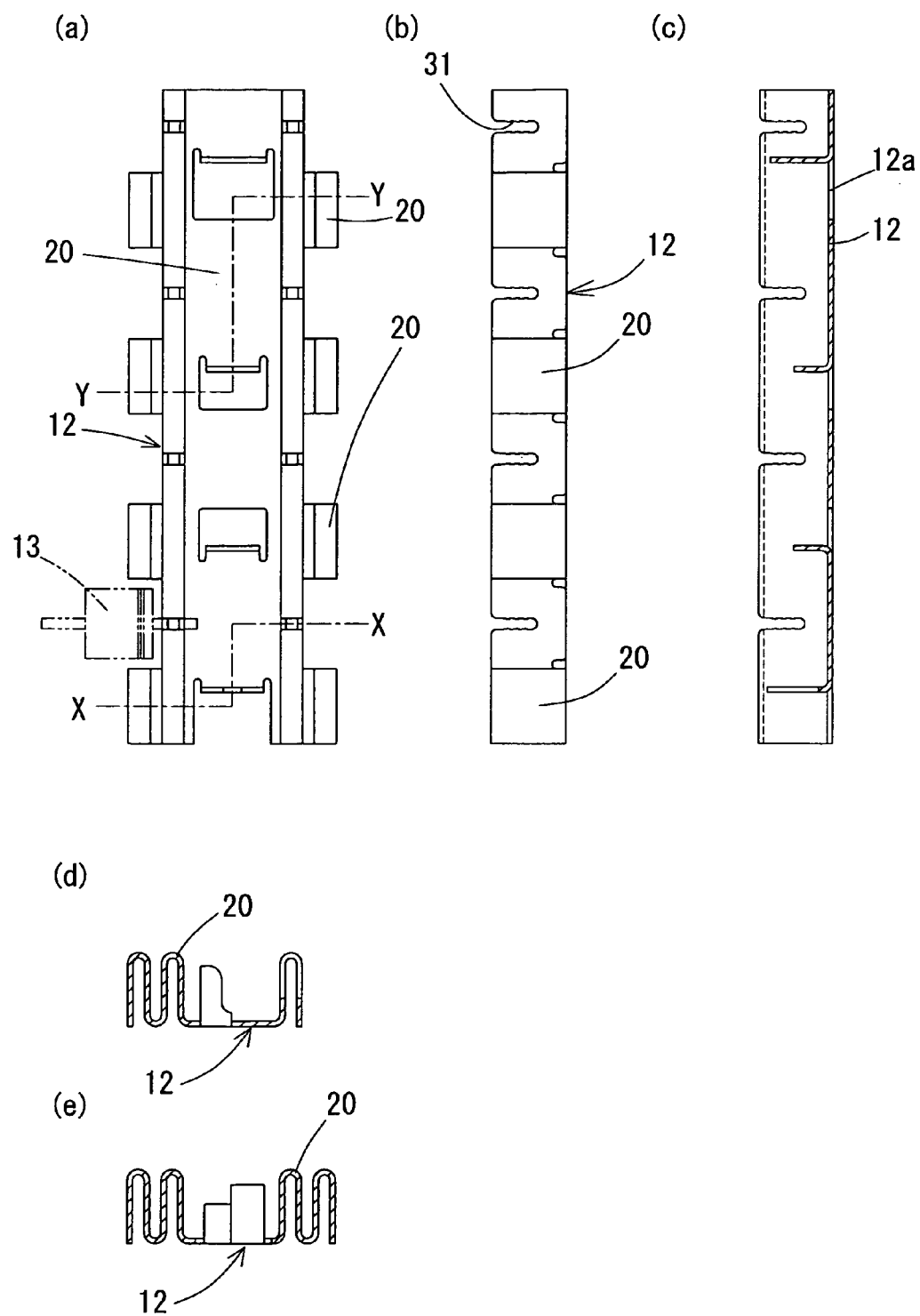

The heat transfer plates 30 may be made of any material that is high in heat conductivity. For example, they may be made of brass, and may be formed with as many notches 31 as the diodes 13 as shown in FIGS. 9(a) and 9(b) to receive the leads 13a of the diodes 13. The heat transfer plates 30 shown in FIG. 9(a) may be mounted as shown in FIG. 1(d) by dotted lines, and those shown in FIG. 9(b) may be mounted as shown in FIGS. 4(a), 6(a) and 6(c) by dotted lines.

Figure 10:
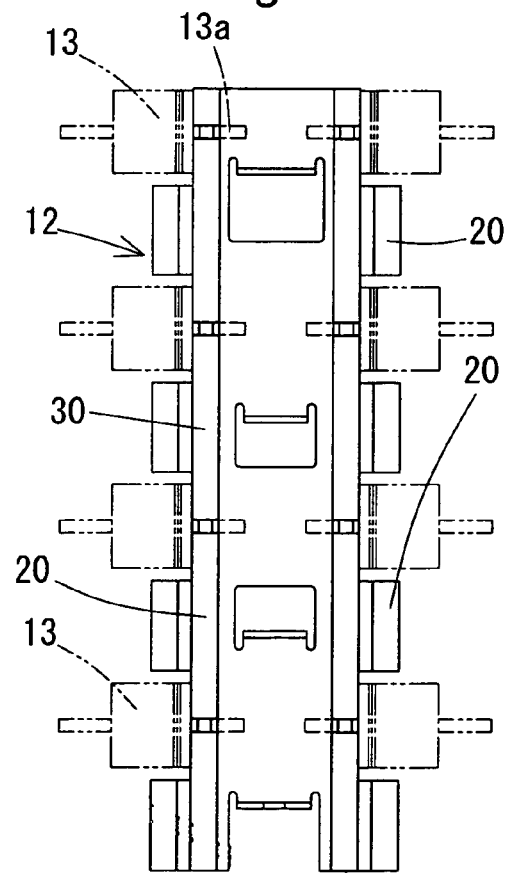

Also, as shown in FIG. 10, the diodes 13 may be brought into contact with the erected terminal boards 12. With this arrangement, because the terminal boards 12 serve as the heat transfer plates 30, the latter may be omitted.

Figure 11:
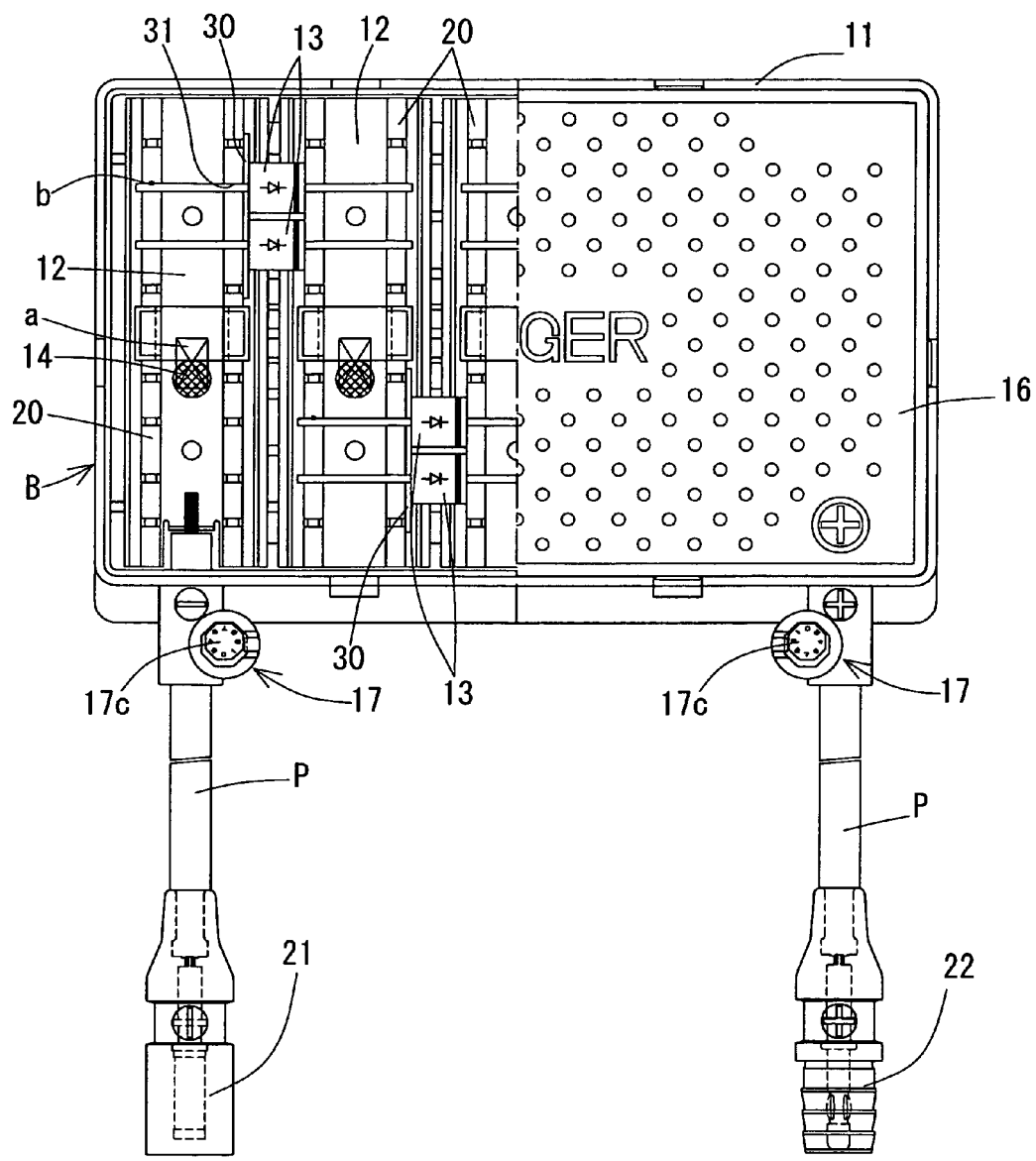

Further, as shown in FIG. 11, the plurality of countercurrent prevention diodes 13 arranged in parallel to each other between each adjacent pair of the terminal boards 12 may be disposed in a staggered fashion in the direction in which the terminal boards 12 are arranged in parallel to each other. This arrangement further increases the heat radiating efficiency through the terminal boards 12 and restricts the temperature rise of the diodes 13 because pairs of the diodes 13 as a heat source are staggered between the terminal boards 12, so that the heat sources are scattered. Preferably, the pairs of the diodes 13 are located near the edges of the terminal boards 12 to increase the degree of scattering.

Figure 12:
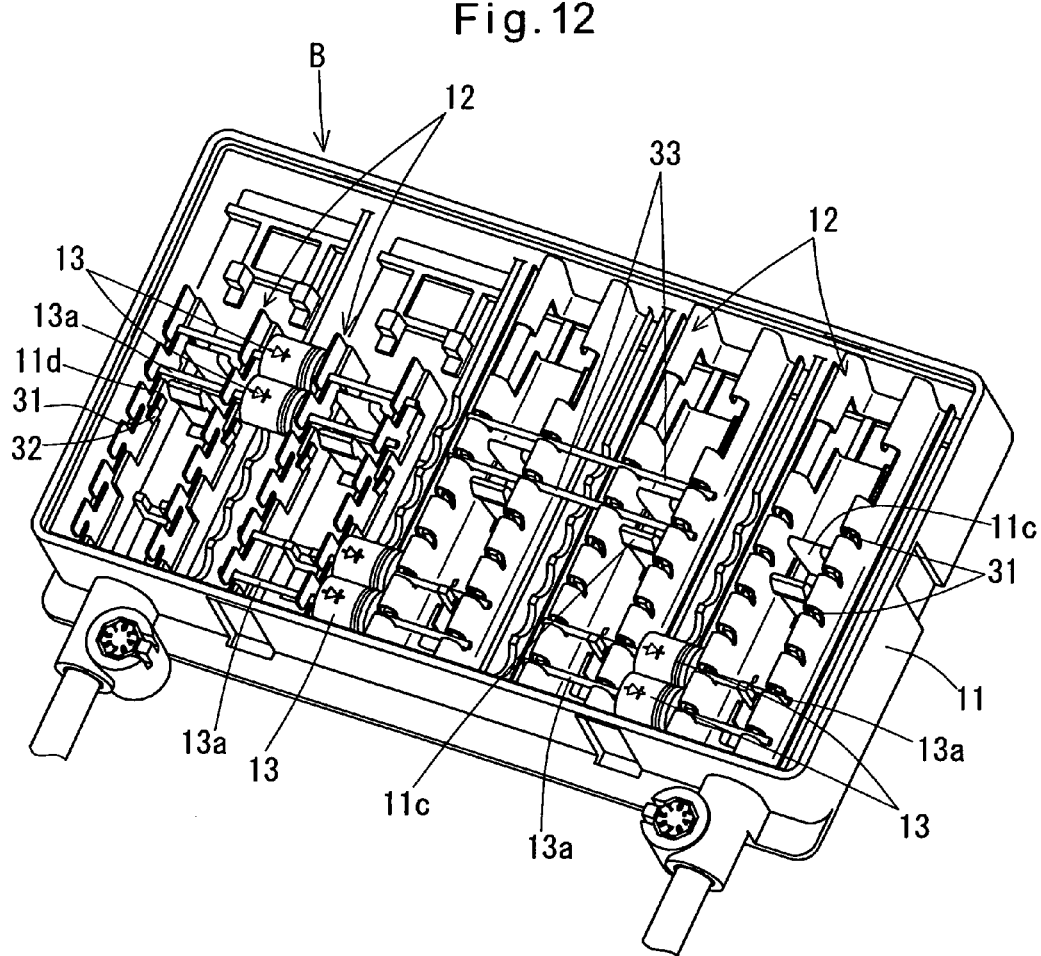
Figure 13:
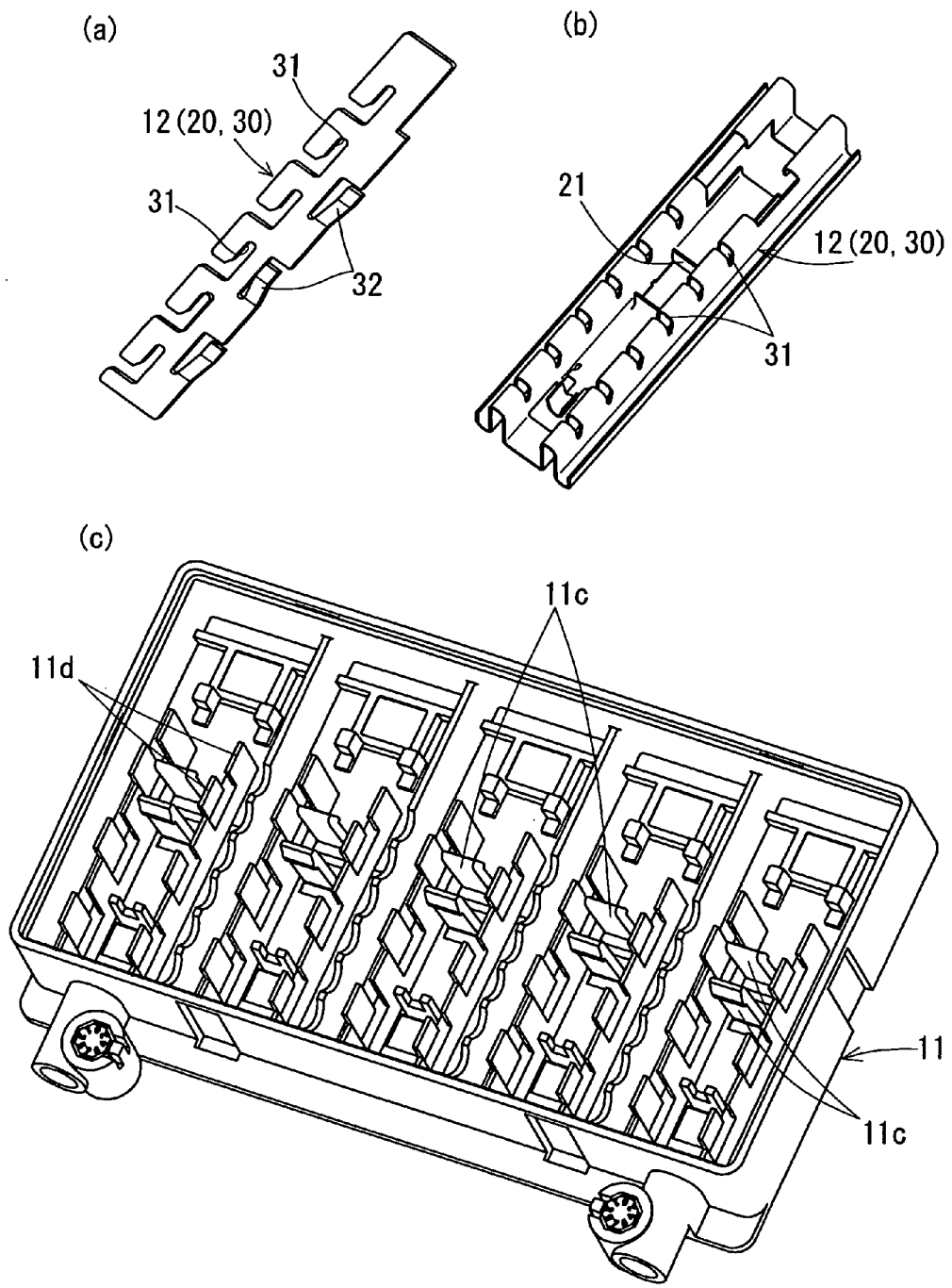
Figure 14:
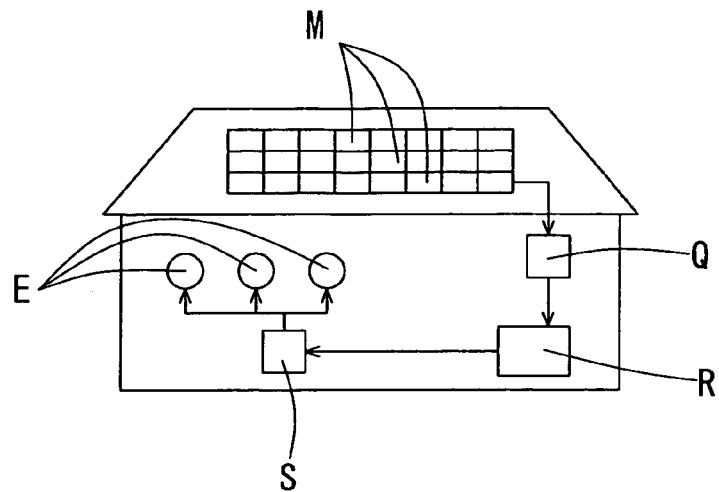
Figure 15:
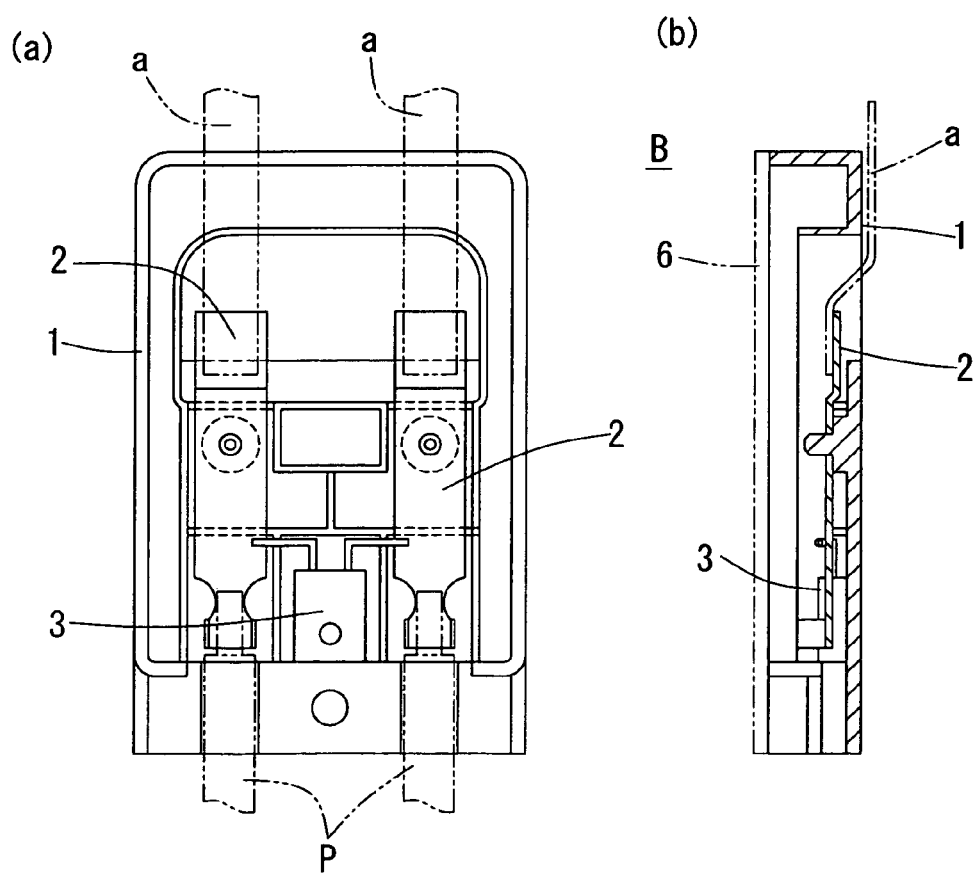

FIGS. 13(a) and 13(b) show other terminal boards 12 embodying the invention. These terminal boards 12 perform not only heat radiating function but heat transfer function according to the manner of mounting. They may be mounted in the terminal box B e.g. in the terminal boards 12 mounted in the box body 11 shown in FIG. 13(c) in the manner as shown in FIG. 12.

With the arrangement shown in FIG. 12, the terminal boards 12 shown in FIG. 13(a) are mounted with their engaging pieces 32 in engagement with engaging pieces 11d of the box body 11. The terminal boards 12 shown in FIG. 13(b) are mounted with claws 11c of the box body 11 fitted in engaging holes 21 of the terminal boards 12. With this arrangement, each terminal board 12 will show heat radiating function of the heat radiating piece 20 and, if the body of the diodes 13 is in contact with the terminal boards 12, the latter will show the temperature uniforming function as the heat transfer plate 30.

For reference, if no diodes 13 are provided between the terminal boards 12, for conductance between the terminal boards 12, conductors 33 are mounted between the adjacent ones of the terminal boards 12 in their notches 31. The number of such conductors 33 is not limited.

In any embodiment, the box body 11 may be integrally or separately provided with heat radiating plates, fins or holes integrally to restrict temperature rise of the diodes 13.

Figure 9:
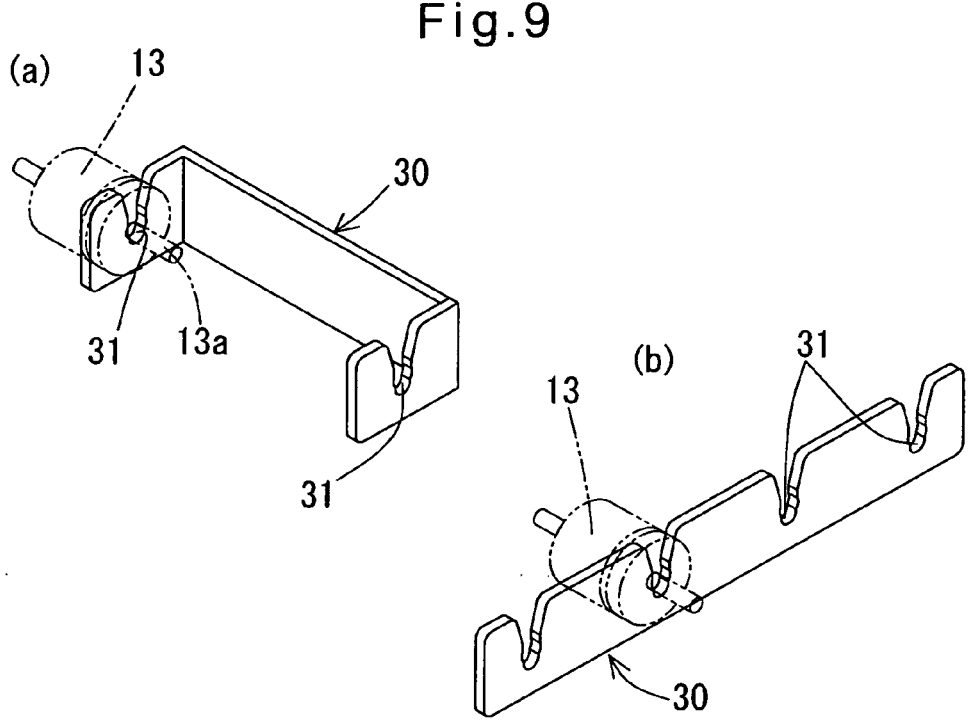

As shown e.g. in FIGS. 6(c), 9 and 12, the diode 13 may have its leads 13a fitted in the notches 31 of the terminal boards 12. If this assures connection characteristics of the diode 13 to the terminal board 12, soldering is not necessary. This eliminates thermal stress during connection by soldering and prevents the performance of the diodes from decreasing due to thermal stress, thereby eliminating variation in the resistance value due to decrease in the performance.

Further, if the diodes 13 with leads 13a are connected to the terminal boards 12 by soldering through the heat radiating pieces 20, their leads 13a are preferably soldered at points b as remote from the diode bodies as possible to minimize thermal stress in soldering. In this case, connection by soldering may be used together with connection by fitting in the notches 31.

The invention claimed is:

1. A terminal box for solar cell modules, the terminal box comprising:
   a box body;
   a plurality of terminal boards arranged in said box body for connecting electrodes of the solar cell modules;
   a plurality of countercurrent prevention diodes located between a pair of adjacent terminal boards of said plurality of terminal boards, said plurality of countercurrent prevention diodes located between said pair of adjacent terminal boards being arranged in parallel to each other, and each of said plurality of countercurrent prevention diodes having a body and a pair of fitting leads, each one of said pair of fitting leads being connected to one of said pair of adjacent terminal boards; and
   a plurality of heat transfer plates, each of said plurality of heat transfer plates being integral with one of said plurality of terminal boards and made of a same material as said plurality of terminal boards,
   wherein said bodies of said plurality of countercurrent prevention diodes located between said pair of adjacent terminal boards are in direct surface contact with said heat transfer plates integral with said pair of adjacent terminal boards, and
   wherein said heat transfer plates integral with said pair of adjacent terminal boards dissipate heat produced in said plurality of countercurrent prevention diodes and equalize temperatures of said plurality of countercurrent prevention diodes.

2. The terminal box of claim 1, wherein each of said plurality of terminal boards has two side edges,
   wherein each of said plurality of heat transfer plates extends at a predetermined angle from one of said two side edges of one of said plurality of terminal boards,
   wherein each of said plurality of heat transfer plates has a free edge and a plurality of grooves in said free edge that extend from said free edge toward said respective terminal board, and
   wherein each of said fitting leads of said plurality of countercurrent prevention diodes is fitted in one of said plurality of grooves, thereby connecting said fitting leads of each of said plurality of countercurrent prevention diodes to said pair of adjacent terminal boards.

3. A terminal box for solar cell modules, the terminal box comprising:
   a box body;
   a plurality of terminal boards arranged in said box body for connecting electrodes of the solar cell modules;
   a plurality of countercurrent prevention diodes located between a pair of adjacent terminal boards of said plurality of terminal boards, said plurality of countercurrent prevention diodes located between said pair of adjacent terminal boards being arranged in parallel to each other, and each of said plurality of countercurrent prevention diodes having a body and a pair of fitting leads, each one of said pair of fitting leads being connected to one of said pair of adjacent terminal boards; and
   a plurality of heat transfer plates, said plurality of heat transfer plates being separate members from said plurality of terminal boards,
   wherein each of said plurality of countercurrent prevention diodes are fitted in said plurality of heat transfer plates, and said bodies of said plurality of countercurrent prevention diodes located between said pair of adjacent terminal boards are in direct surface contact with said plurality of heat transfer plates, and
   wherein said plurality of heat transfer plates dissipate heat produced in said plurality of countercurrent prevention diodes and equalize temperatures of said plurality of countercurrent prevention diodes.

4. The terminal box of claim 3, further comprising a plurality of heat radiating pieces made of a same material as said plurality of terminal boards,
   wherein each of said plurality of terminal boards has a side edge, and
   wherein each of said plurality of heat radiating pieces protrude from one of said side edges of said plurality of terminal boards.

5. The terminal box of claim 1,
   wherein each of said bodies of said plurality of countercurrent prevention diodes have two opposed flat surfaces,
   wherein each of said plurality of heat transfer place have a flat surface, and
   wherein said two opposed flat surfaces of said bodies of said plurality of countercurrent prevention diodes located between said pair of adjacent terminal boards are in direct surface contact with said flat surfaces of said plurality of heat transfer plates.

6. The terminal box of claim 3,
   wherein each of said bodies of said plurality of countercurrent prevention diodes have two opposed flat surfaces,
   wherein each of said plurality of heat transfer place have a flat surface, and
   wherein said two opposed flat surfaces of said bodies of said plurality of countercurrent prevention diodes located between said pair of adjacent terminal boards are in direct surface contact with said flat surfaces of said plurality of heat transfer plates.

7. The terminal box of claim 2, wherein each of said plurality of heat transfer plates extends at the predetermined angle from one of said two side edges of one of said plurality of terminal boards such that each of said plurality of heat transfer plates are substantially perpendicular to said one of said two side edges.

* * * * *